Jan. 28, 1947.　　　G. A. TINNERMAN　　　2,414,986
FASTENING DEVICE
Filed March 16, 1944

INVENTOR.
GEORGE A. TINNERMAN
BY
Bates, Teare, & McKean
ATTORNEYS

Patented Jan. 28, 1947

2,414,986

UNITED STATES PATENT OFFICE 2,414,986

FASTENING DEVICE

George A. Tinnerman, Cleveland, Ohio, assignor to Tinnerman Products, Inc., Cleveland, Ohio, a corporation of Ohio Application March 16, 1944, Serial No. 526,685

4 Claims. (Cl. 24—81)

This invention relates to fastener members and to fastener installations, particularly those wherein a trim strip of plastic material is to be secured to a supporting surface, such as a metal supporting panel.

One of the objects of the present invention is the provision of a fastening device having means thereon for engagement with a rib or the like projecting from the inner surface of the trim strip, so as to be secured in fixed assembly with the strip solely by inherent spring tension of the metal of which the fastening device is made, and also the provision of means to effect a snap fastener engagement with a supporting panel through an aperture thereof, to secure the strip firmly to the panel.

Figure 1:
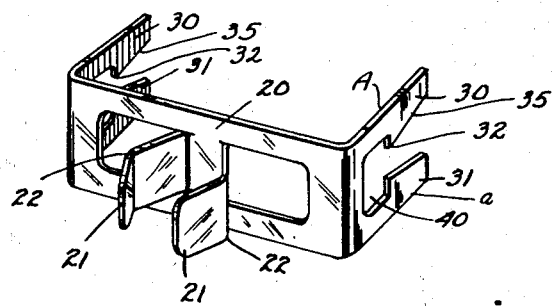
Figure 2:
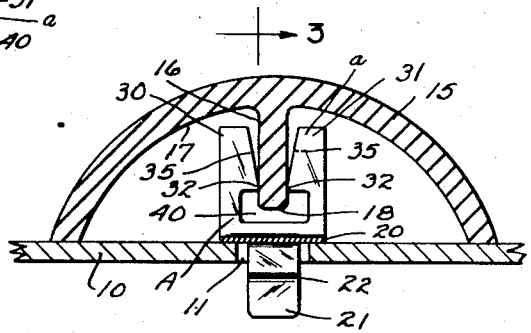
Figure 3:
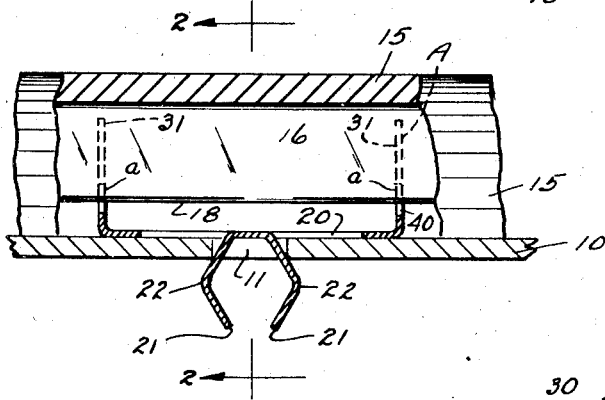

Referring to the drawing, Fig. 1 is a perspective view of a fastening device which embodies my invention; Fig. 2 is a transverse section through a trim strip showing it applied to a panel by means of a fastener embodying the present invention; Fig. 3 is a section taken on a plane indicated by the line 3—3 in Fig. 2, and Fig. 4 is a perspective view showing a modified form of fastener construction.

My invention is illustrated in connection with a flange supporting panel 10 which is preferably metal and which has an opening 11 therein that is either square or rectangular in shape. The part to be supported on the panel is illustrated as a hollow strip 15 which may be made of plastic material and which is curved in transverse cross section, as shown in Fig. 2. A projection or rib 16 extends from the inner surface 17 of the strip and has the lower edge 18 thereof terminating short of the upper surface of the panel 10.

To attach the trim strip 15 to the panel, I utilize a fastening device A in the form of a sheet metal strip having a base 20 which is adapted to lie against the top face of the panel 10, and which has legs 21 formed and extending downwardly therefrom, each leg having a shoulder 22 thereon for snap fastening engagement with the walls of the aperture 11 in the panel 10. As is shown, for example in Fig. 3, the base has its end portions a extending upwardly, and each end portion is bifurcated to provide arms 30 and 31, each of which has a tooth 32 on the inner edge thereof, and each of which is yieldable laterally with respect to the other to permit the entrance of the rib 16 therebetween, as is shown in Fig. 2. The entrance is facilitated by tapering the inner edge of each arm from the tooth to the outer or free end thereof as indicated at 35.

Figure 4:
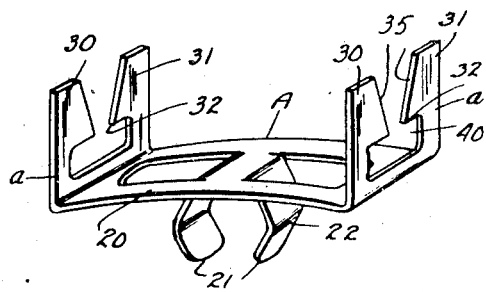

Fig. 4 shows a modification of my invention wherein the parts correspond to those of Fig. 1, bear the same reference characters, and wherein the fastener has the same general shape as that of Fig. 1. It differs, however, in the fact that the base 20 is arched from end to end so as to impart added resilience to the body and thereby increase the holding power of it upon the panel 10 to which it may be applied.

The fastener embodying the present invention is advantageous in that a number of them may be quickly brought into snap fastening engagement with a panel through suitable apertures therein, and may be retained thereagainst by means of the shoulder portions 22 on the legs of the fastener. Each fastener is prevented from rotating within the panel by virtue of the fact that the walls of the opening adjacent the side edges of the leg are parallel and are, therefore, adapted to act as guides for holding the fasteners in proper aligned position. After all of the fasteners are positioned as aforesaid, then the trim strip may be snapped into place by forcing the rib 16 thereof between the resilient arms on the end of each fastener. In the applied position, the end of the rib remote from the strip clears the bottom of the recess 40 in each bifurcated portion so that the strip is held in assembled position solely by the spring tension of the arms 13 and 14 at each end of the fastener. To facilitate such retention, the distance between the points of the teeth 32 is less than the thickness of the rib, whereby the inward motion of the rib toward the base of the fasteners operates to spread the arms apart sufficiently to cause the teeth to bite into the rib and thereby to hold it securely in place.

A fastener made according to the present invention may be constructed of a strip of metal and, therefore, may be economically made on a production basis. It affords a comparatively large bearing surface between the body of the fastener and the panel and is capable of exerting considerable clamping action against the rib by virtue of the fact that the spreading of the arms takes place in the plane thereof. The assembly of the strip to the panel is, therefore, accomplished without the need for extraneous securing devices other than the fastener per se.

I claim:

1. A fastening device comprising a sheet metal strip having a pair of legs extending downwardly in the same general direction from the strip, said legs being shouldered intermediate their ends for snap fastening engagement to an aperture in a part to which the fastener may be applied, and said strip having end portions thereof extending upwardly in the same general direction so as to provide a channel-shaped structure, each end portion having a pair of arms, each with a tooth on its inner edge, and the arms on each end being movable outward with respect to each other in the same plane as the associated end portion and being resilient to cause their teeth to bitingly engage an interposed member.

2. A fastener for holding an article having a rib against a suitable support comprising a strip of resilient sheet material having its end portions projecting therefrom in the same general direction, each end portion being bifurcated to produce two arms, the space between the arms extending inwardly for a distance and then enlarged laterally in each direction to cause the inner faces of the arms to provide two teeth to engage opposite faces of said rib, said enlarged opening between the arms providing means whereby they may be readily sprung apart laterally and means for securing the body portion of the fastener to a support.

3. A fastener for holding an article having a rib against a suitable support comprising a strip of resilient sheet material having an intermediate body portion and having end portions projecting therefrom in the same general direction, each end portion being bifurcated to produce two arms each having a tooth on the inner edge thereof formed to resiliently engage opposite faces of said rib so as to facilitate insertion of the rib between the arms but to resist withdrawal therefrom, and means for securing the fastener to a support having an aperture, said means comprising a pair of legs integral with said body portion and anchored to opposite edges of the same intermediate region of such portion, the legs extending downwardly and diverging and then converging and free from each other at their lower ends, whereby they may be sprung toward each other without distorting the body portion and thus passed through the aperture in the support and engage the support at opposite edges of the aperture.

4. A fastener adapted to secure a part having a rib to a support having an aperture therein, said fastener having a base arched from end to end and resilient means carried thereby and extending from the concave face of the base and adapted to enter said aperture for making a snap fastening engagement therewith, and said fastener having the end portions thereof extending in the same general direction which is substantially opposite to that of said resilient means, each end portion being bifurcated to provide a pair of arms, each arm having a tooth on the inner edge thereof, and said arms being resilient, whereby the rib on said part may enter the space between the arms and be held thereagainst solely by engagement of the teeth on the arms against opposite faces of said rib.

GEORGE A. TINNERMAN.